(12) United States Patent
Mandal

(10) Patent No.: US 6,907,349 B2
(45) Date of Patent: Jun. 14, 2005

(54) ACOUSTIC SIGNAL PROCESSING METHOD USING ARRAY COHERENCY

(75) Inventor: Batakrishna Mandal, Missouri City, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 10/827,776

(22) Filed: Apr. 20, 2004

(65) Prior Publication Data

US 2004/0199331 A1 Oct. 7, 2004

Related U.S. Application Data

(62) Division of application No. 09/860,294, filed on May 18, 2001, now Pat. No. 6,748,329.
(60) Provisional application No. 60/254,316, filed on Dec. 8, 2000.

(51) Int. Cl.⁷ .............................. G01V 1/28; G01V 1/00
(52) U.S. Cl. ........................................... 702/14; 367/49
(58) Field of Search .............................. 702/14, 17, 18; 367/45, 27, 32, 48, 49

(56) References Cited

U.S. PATENT DOCUMENTS

| | | |
|---|---|---|
| 4,794,572 A | 12/1988 | Sondergeld et al. |
| 4,803,666 A | 2/1989 | Alford |
| 4,817,061 A | 3/1989 | Alford et al. |
| 4,888,743 A | 12/1989 | Thomsen |
| 4,903,244 A | 2/1990 | Alford |
| 4,933,913 A | 6/1990 | Thomsen |
| 5,027,332 A | 6/1991 | Alford |
| 5,029,146 A | 7/1991 | Alford |
| 5,136,554 A | 8/1992 | Thomsen et al. |
| 5,214,613 A | 5/1993 | Emersoy |
| 5,278,805 A | 1/1994 | Kimball |
| 5,541,890 A | 7/1996 | Tang |
| 5,594,706 A | 1/1997 | Shenoy et al. |
| 5,712,829 A | 1/1998 | Tang et al. |
| 5,740,124 A | 4/1998 | Chunduru et al. |
| 5,808,963 A | 9/1998 | Emersoy |
| 6,023,443 A | 2/2000 | Dubinsky et al. |
| 6,141,622 A | 10/2000 | Keller et al. |
| 6,188,961 B1 | 2/2001 | Mandal |
| 6,581,010 B2 * | 6/2003 | Dubinsky et al. .............. 702/9 |
| 6,661,737 B2 * | 12/2003 | Wisniewski et al. .......... 367/25 |
| 6,691,036 B2 * | 2/2004 | Blanch et al. ................ 702/11 |
| 6,748,329 B2 * | 6/2004 | Mandal ....................... 702/14 |

FOREIGN PATENT DOCUMENTS

EP    0703349    3/1996

OTHER PUBLICATIONS

Burrascano et al., Seismic Inversion by the Combined Use of Predictive and Semblance Techniques, 1990 IEEE, pp. 1011–1014.*

(Continued)

*Primary Examiner*—John Barlow
*Assistant Examiner*—Toan M. Le
(74) *Attorney, Agent, or Firm*—Conley Rose, P.C.

(57) ABSTRACT

A system and method is provided for characterizing earth formations. In one embodiment, the method includes passing a logging tool through a borehole and repeatedly: (a) triggering an acoustic wave generator; (b) recording acoustic waveforms received by receivers in the logging tool; (c) determining a time semblance of the recorded acoustic waveforms; and (d) smoothing the time semblance. In a different embodiment, a phase semblance of the recorded acoustic waveforms is determined and smoothed. The smoothing may be performed using an adaptive wavelet denoising technique or an adaptive moving average filter technique. In each case the average time or frequency spacing between semblance peaks is preferably determined and used to adapt the smoothing operation in a manner that varies with the slowness value s.

9 Claims, 8 Drawing Sheets

OTHER PUBLICATIONS

Kimball, Shear Slowness Measurement by Dispersive Processing of the Borehole Flexural Mode, Mar.–Apr. 1998, Geophysics, vol. 63, No. 2, pp. 337–344.*

Marfurt et al., 3–D Seismic Attributes Using a Semblance-–Based Coherency Algorithm, Jul.–Aug. 1998, Geophysics, vol. 63, No. 4, pp. 1150–1165.*

Kimball et al., Semblance Processing of Borehole Acoustic Array Data, Mar. 1984, Geophysics, vol. 49, No. 3, pp. 274–281.*

Kozak et al., Estimation of Formation Shear Slowness Using Phase Velocity and Semblance Method–Comparative Studies, Apr. 22, 2002, (published on WorldWideWeb: www-.magneticpulse.com/pdf/MPI_SEG2001.PDF).*

Alain Brie, et al; New Directions in Sonic Logging; Spring 1998; (pp. 40–55); Oilfield Review.

Chung Chang, et al; Localized Maps of the Subsurface; Spring 1998; (pp. 56–66); Oilfield Review.

G. Brewton; The Geology of the Skinner, Bartlesville and Misener Sandstones in Well DM21A at Catoosa; Nov. 1996; Amoco Corporation.

B. A. Auld; Acoustic Fields and Waves in Solids; Feb. 1994 (pp. 68–87); (pp. 163–189); (pp. 191–263); (pp. 367–383); (pp. 383–409); (pp. 411–423); (pp. 1–61); (pp. 63–133); (pp. 375–414); (pp. 397–414); A Wiley–Interscience Publication.

C. Esmersoy; Dipole Shear Anistropy Logging; 1994; (pp. 1138–1142); Expanded Abstracts of 64th Annual Meeting, SEG.

N. Cheng, C. H. Cheng; Borehole Geophysics 1: Well Logging; 1995; (pp. 1–4); Expanded Abstracts of 64th Annual Meeting, SEG.

International Search Report Dated Jun. 20, 2000; (4 p.).

J. E. White, Underground Sound, Application of Seismic Waves, Methods in Geochemistry and Geophysics, 18, Elsevier, 1983, pp. 20–35 and 162–193.

D. P. Schmitt et al., Full–Wave Acoustic Logging: Synthetic Microseismograms and frequency–wavenumber analysis, Geophyics, vol. 50, No. 11, Nov. 1985, pp. 1756–1778.

Joakim O. Blanch et al., Processing for Sonic Waveforms, U.S. Appl. No. 09/547,304, filed Apr. 11, 2000.

* cited by examiner

ACOUSTIC SIGNAL PROCESSING METHOD USING ARRAY COHERENCY

CROSS-REFERENCE TO RELATED APPLICATIONS

This application is a continuation of U.S. patent application Ser. No. 09/860,294, titled, Acoustic Signal Processing Method Using Array Coherency, filed on May 18, 2001, now U.S. Pat. No. 6,748,329 whose inventor is Batakrishna Mandal and U.S. Provisional Patent Application Application Ser. No. 60/254,316, filed Dec. 8, 2000, entitled "Array Coherency Method Of Signals," whose inventor is Batakrishna Mandal, both hereby incorporated herein by reference in their entirety.

BACKGROUND OF THE INVENTION

1. Field of the Invention

The present invention relates broadly to the processing of information obtained by an acoustic borehole tool. More particularly, the invention relates to the real-time or post-processing of acoustic wave data to determine the formation velocity and dispersion properties of an acoustic wave propagating along the borehole using a coherence method of acoustic wave data analysis.

2. Description of the Related Art

Acoustic well logging is a well developed art, and details of acoustic logging tools and techniques are set forth in A. Kurkjian, et al., "Slowness Estimation from Sonic Logging Waveforms", Geoexploration, Vol. 277, pp. 215–256 (1991); C. F. Morris et al., "A New Sonic Array Tool for Full Waveform Logging," SPE-13285, Society of Petroleum Engineers (1984); A. R. Harrison et al., "Acquisition and Analysis of Sonic Waveforms From a Borehole Monopole and Dipole Source . . . " SPE 20557, pp. 267–282 (September 1990); and C. V. Kimball and T. L. Marzetta, "Semblance Processing of Borehole Acoustic Array Data", Geophysics, Vol. 49, pp. 274–281 (March 1984), all of which are hereby incorporated by reference herein. An acoustic logging tool typically includes an acoustic source (transmitter), and a set of receivers that are spaced several inches or feet apart. An acoustic signal is transmitted by the acoustic source and received at the receivers of the borehole tool which are spaced apart from the acoustic source. Measurements are repeated every few inches as the tool is drawn up (or down) the borehole. The acoustic signal from source travels through the formation adjacent the borehole to the receiver array, and the arrival times and perhaps other characteristics of the receiver responses are recorded. Typically, compressional wave (P-wave), shear wave (S-wave), and Stoneley wave arrivals and waveforms are detected by the receivers and are processed. The processing of the data is often accomplished uphole or may be processed real time in the tool itself. Regardless, the information that is recorded is typically used to find formation characteristics such as formation slowness (the inverse of acoustic speed), from which pore pressure, porosity, and other formation property determinations can be made. In some tools, the acoustic signals may even be used to image the formation.

Many different techniques are known in the art for processing the acoustic wave signals in order to obtain information regarding the borehole and/or formation. Typically, the processing involves digitizing the received signal at a desired sampling rate and then processing the digitized samples according to desired techniques. Examples may be found in the references cited above, as well as in articles such as A. R. Harrison et al., "Acquisition and Analysis of Sonic Waveforms From a Borehole Monopole and Dipole Source . . . " SPE 20557, pp. 267–282 (September 1990).

Compressional slowness has been computed using Slowness-Time Coherence (STC) processing. C. V. Kimball and T. L. Marzetta, "Semblance Processing of Borehole Acoustic Array Data", Geophysics, Vol. 49, pp. 274–281 (March 1984). In STC processing, the measured signal is time window "filtered" and stacked, and a semblance function is computed. The semblance function relates the presence or absence of an arrival with a particular assumed slowness and particular assumed arrival time. If the assumed slowness and arrival time do not coincide with that of the measured arrival, the semblance takes on a smaller value. Consequently, arrivals in the received waveforms manifest themselves as local peaks in a plot of semblance versus slowness and arrival time. These peaks are typically found in a peak-finding routine discussed in the aforementioned article by Kimball and Marzetta, which is hereby incorporated herein by reference.

Acoustic LWD has many potential applications in oil field services including seismic correlation while drilling, pore pressure and porosity determinations, and mechanical property determinations. Because telemetry cables may not be available in these situations, the transfer of data may be accomplished via the use of pulses in the flow of the drilling mud (i.e., mud pulse telemetry). While the drilling penetration rate is very slow relative to normal logging rates, data acquisition still can far exceed the highest data transmission rates in the mud. Thus, in any proposed acoustic LWD art, processing of data downhole may be highly desirable, although the downhole computing power may be limited. Alternatively, data may be stored in the memory of the downhole tool, but this could require frequent "tripping" of the drill string.

One technique that permits the downhole processing of data with limited computing power is to calculate the semblance function using time windowing and stacking of the measured acoustic signal. However, windowing the signal may result in inaccuracies and nonlinearities based on the window width for the resulting semblance. Extrapolating from the windowed semblance often results in adding new errors and amplifying existing errors.

It would be advantageous if a non-windowed technique could be used to calculate semblance and determine acoustic speed including the formation velocity. It would also be advantageous if these parameters could be calculated using each data point collected, require a minimal amount of processing, and reduce the errors typically occurring in windowed calculations of formation velocity and semblance.

BRIEF SUMMARY OF THE INVENTION

A system and method is provided for characterizing earth formations. In one embodiment, the method includes passing a logging tool through a borehole and repeatedly: (a) triggering an acoustic wave generator; (b) recording acoustic waveforms received by receivers in the logging tool; (c) determining a time semblance (as a function of slowness and time) of the recorded acoustic waveforms; and (d) smoothing the time semblance. In a different embodiment, a phase semblance (as a function of slowness and frequency) of the recorded acoustic waveforms is determined and smoothed. The smoothing may be performed using an adaptive wavelet transform technique or an adaptive moving average filter technique. In each case the average time or frequency spacing between semblance peaks is preferably determined and used to adapt the smoothing operation in a manner that varies with the slowness value s.

BRIEF DESCRIPTION OF THE DRAWINGS

A better understanding of the present invention can be obtained when the following detailed description of the preferred embodiment is considered in conjunction with the following drawings, in which.

Figure 1A:
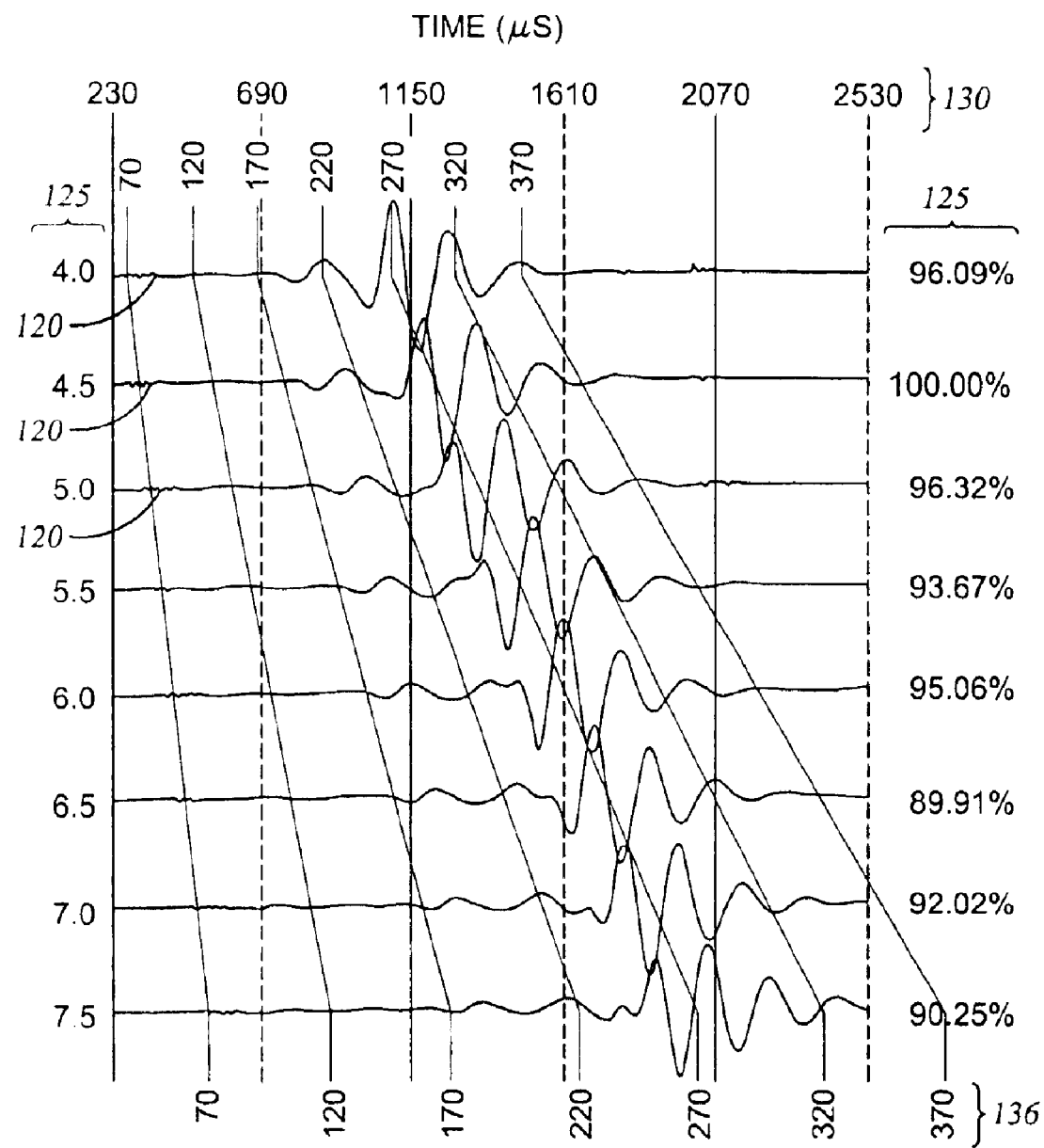
FIG. 1A shows acoustic wave signals categorized by the distance of the receiver from the transmitter and the time at which the acoustic signal is received after being transmitted.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

An acoustic logging tool generally includes several receivers axially spaced along the logging tool. An acoustic transmitter generates an acoustic wave that propagates along the well bore and is detected by the receivers. FIG. 1A shows an example of the data collected by an acoustic logging tool from in response to a the wave generated by the transmitter. Each of the waveforms 120 is recorded by a corresponding receiver as a function of time 130 since the transmitter firing. The receivers are each associated with a distance 125 from the transmitter. After recording the waveforms, the logging tool typically normalizes the waveform so that they have the same signal energy, and FIG. 1A expresses the normalization factor as a percentage of transmitted signal energy 135.

FIG. 1A also shows a graduated series of sloping lines to indicate the relative waveform delays to be expected for given slowness values 136. Slower waves (those having larger slowness values) take longer to reach the more distant receivers, and accordingly, their effect on the recorded waveforms is increasingly delayed for larger distances.

To identify waves and their slowness values, the acoustic logging tool may calculate the time semblance E(t,s) as a function of slowness and time for the data. This information in turn may be used to determine various formation properties, including formation velocity and dispersion of acoustic waves. The equation for the time semblance E(t,s) is:

$$E(t, s) = \frac{1}{N} \frac{\left(\sum_{i=1}^{N} x_i(t - sd_i)\right)^2}{\sum_{i=1}^{N} x_i^2(t - sd_i)} \quad (1)$$

In the above equation, N is the number of receivers, and hence is also the number of recorded waveforms, $x_i(t)$ is the waveform recorded by the ith receiver, $d_i$ is the distance of the ith receiver from the transmitter, and s is the slowness. In Equation 1, the quantity $(t-sd_i)$ is the relative time at the ith receiver for a given slowness s.

The recorded waveforms $x_i(t)$ are ordinarily sampled digitally. Accordingly, it may be necessary to perform sample interpolation to account for slowness shift of the relative time. The acoustic logging tool preferably resamples the waveforms for each slowness value s at which the semblance is calculated.

Semblance values E(t,s) range between zero and one. Values near one indicate a high correlation between the various recorded waveforms at the given time and slowness, and hence indicate the presence of a propagating wave having that slowness value. Values near zero indicate little correlation between the various waveforms at the given time and slowness value, and hence provide no indication of a propagating wave having that slowness value.

Figure 1B:
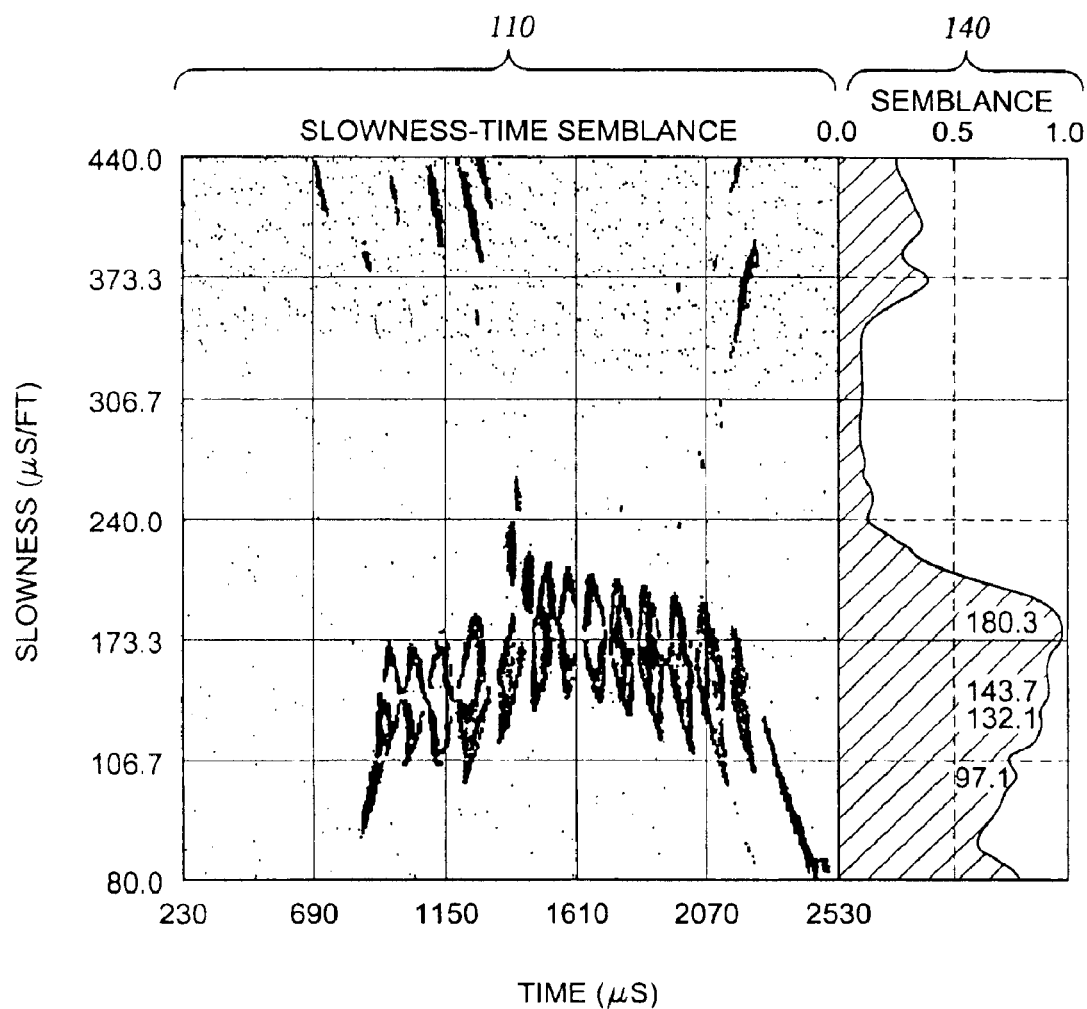
FIG. 1B shows the time semblance as a function of slowness and time for the signals in FIG. 1A.

FIG. 1B shows the time semblance E(t,s) plot 110 for the data in FIG. 1A. The semblance axis is perpendicular to the page. Also shown on the right is a maximum semblance vs. slowness plot 140 to aid in interpretation of plot 110. The E(t,s) plot 110 shows the effect of constructive and destructive interference caused by the oscillatory waveforms 120. This effect is undesirable, as it makes identification of formation velocity properties extraordinarily difficult.

Figure 2:
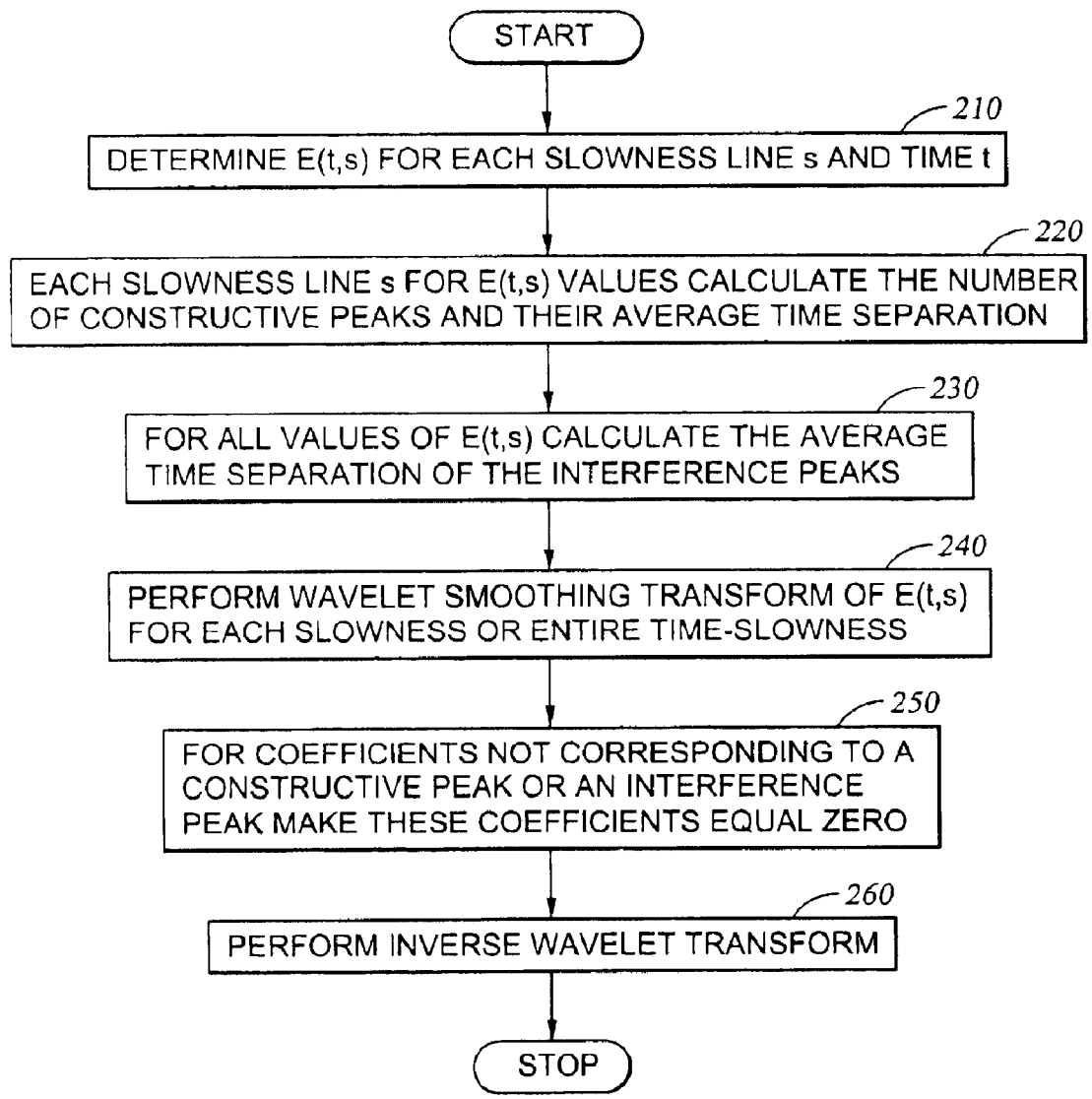
FIG. 2 shows a method in accordance with one exemplary embodiment of the present invention to determine time semblance for each slowness line s and time t using wavelet smoothing/denoising.

Turning now to FIG. 2, in accordance with one exemplary embodiment of the invention, a method is shown for calculating the time semblance E(t,s) using a coherence method of acoustic wave data analysis. In block 210, Equation 1 is used to determine the semblance E(t,s) for each slowness line s at each time t. In block 220, the number and average time separation of semblance peaks is determined for each slowness line s. In block 230, the average time separation of semblance peaks may optionally be determined for the entire plot. This is preferably done by a weighted average, giving each average time separation for a given slowness value s a weight of one less than the number of peaks found for that value of s. In block 240, a wavelet transform is performed. In a preferred embodiment, the wavelet transform performed by integrating along the time axis for each slowness value s. This provides a set of wavelet transform coefficients that are functions of delay, frequency, and slowness. In block 250, some of the wavelet transform coefficients are set to zero. The average peak separation for each slowness value s is first used to set a cutoff point for that value of s. (The cutoff point may be chosen to correspond to a time value equal to or greater than 1.5 times the time separation of interference peaks.) Alternatively, a cutoff point may be set for the entire domain using the plot-average time separation of peaks. Wavelet transform coefficients above the cutoff point are then set to zero. In block 160, an inverse wavelet transform is performed. Together, blocks 220–260 constitute a wavelet smoothing, or "denoise", operation that removes high-frequency effects (such as the constructive and destructive interference) from the semblance plot.

Figure 3:
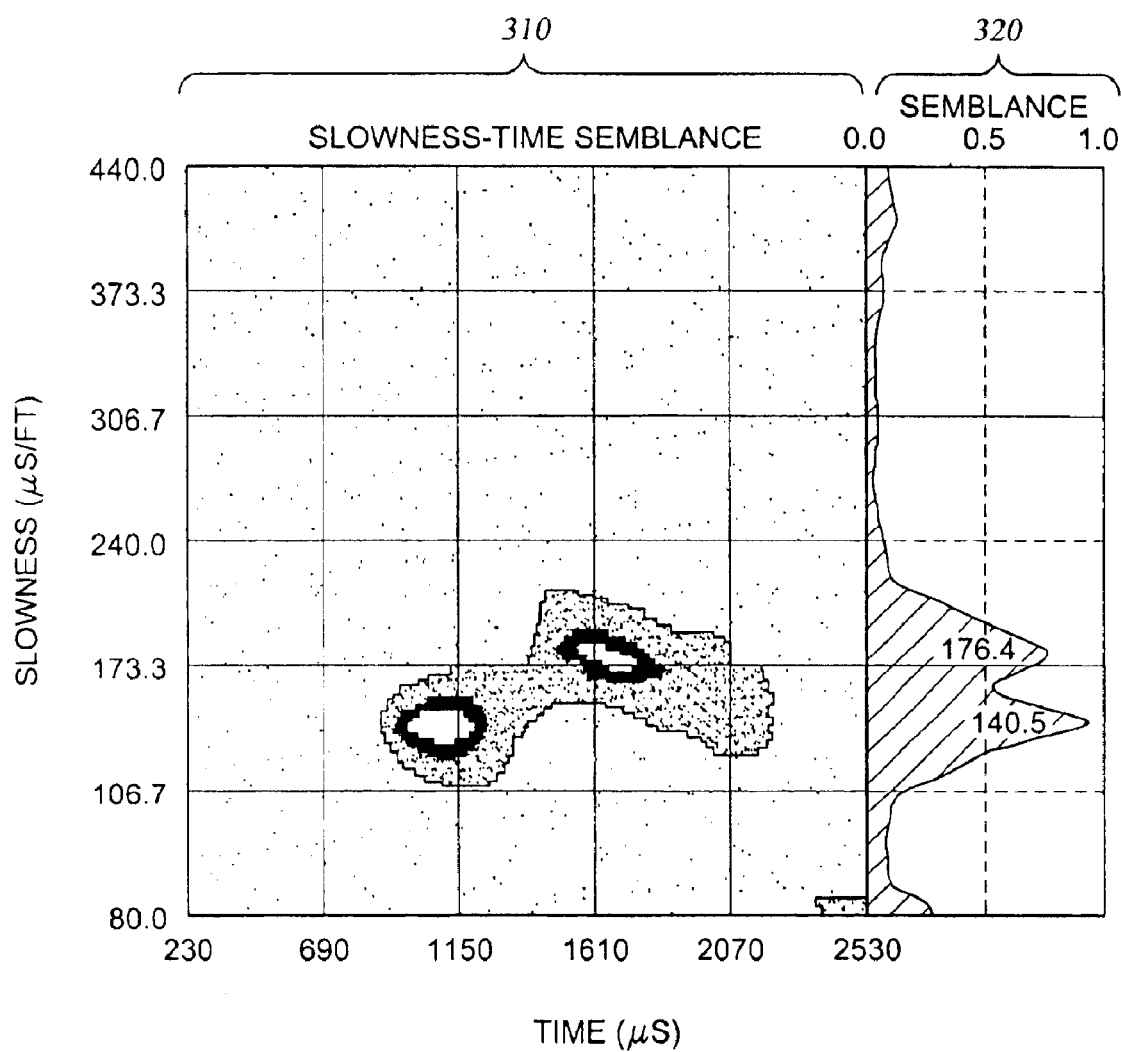
FIG. 3 shows the time semblance as a function of slowness and time indicating a fast wave and slow wave after wavelet smoothing/denoising.

FIG. 3 shows the time semblance plot 310 after the above-described wavelet smoothing/denoising. Again, a separate graph of maximum semblance 320 as a function of slowness is given to aid in interpretation. Note that two formation velocities are clearly present in this plot, unlike the plot of FIG. 1B.

Figure 4:
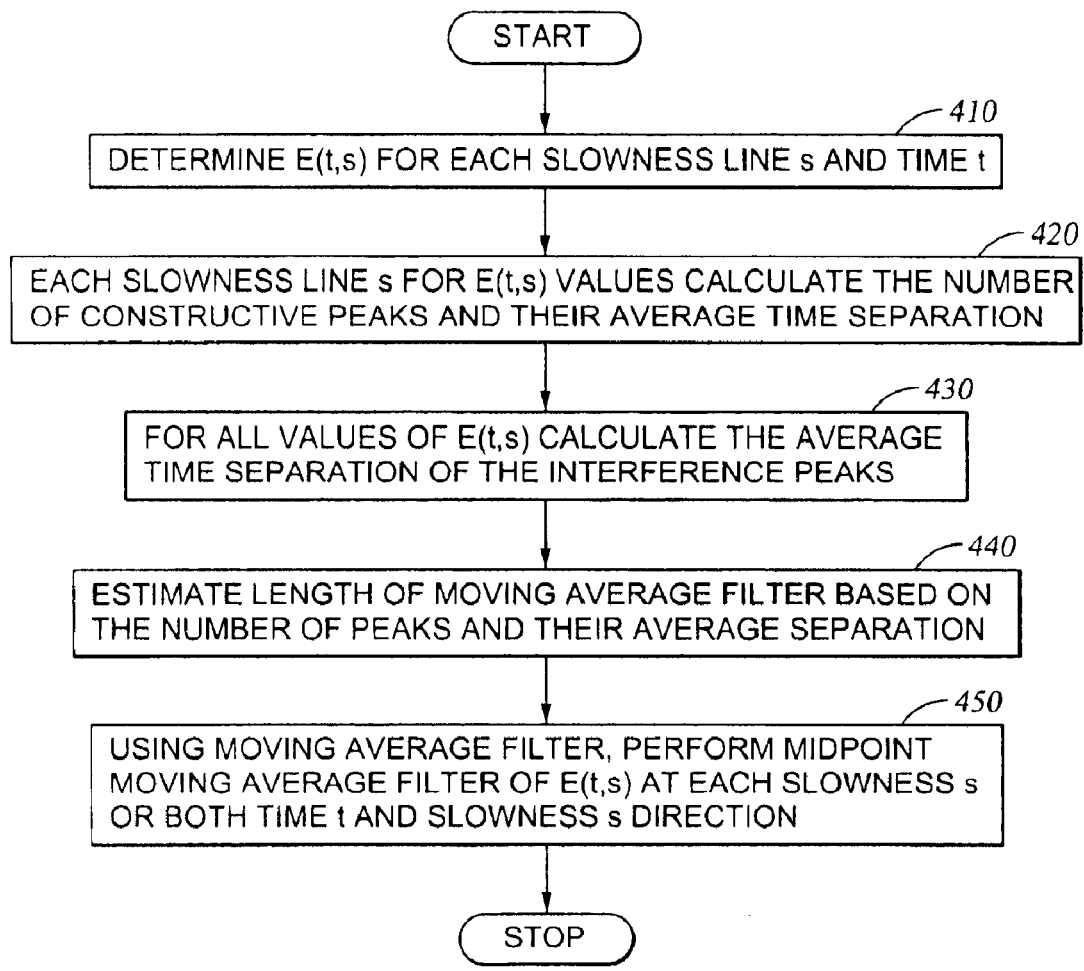
FIG. 4 shows a method in accordance with one exemplary embodiment of the present invention to determine time semblance for each slowness line s and time t using moving average smoothing.

Turning now to FIG. 4, in accordance with another exemplary embodiment of the invention, a method of calculating the time semblance E(t,s) is shown. In block 410, Equation 1 is used to determine semblance E(t,s) for each slowness value s at each time t. In block 420, the number and average time separation of semblance peaks is determined for each slowness value s. In block 430, the average time separation of semblance peaks may be optionally determined for the entire plot. In block 440, the semblance values are filtered along the time axis for each slowness value s using a moving average smoothing filter. In the preferred embodiment, the time window size of the moving average filter is chosen in accordance with the average time separation of semblance peaks for that slowness value s. More preferably, the time window size is chosen to be about 1.5 times the average time separation for that slowness value s. In essence, the filtering operation is adaptive based on the average time separation of semblance peaks. In an alternate embodiment, the moving average filter is set according to the average time separation of semblance peaks for the entire plot.

Figure 5:
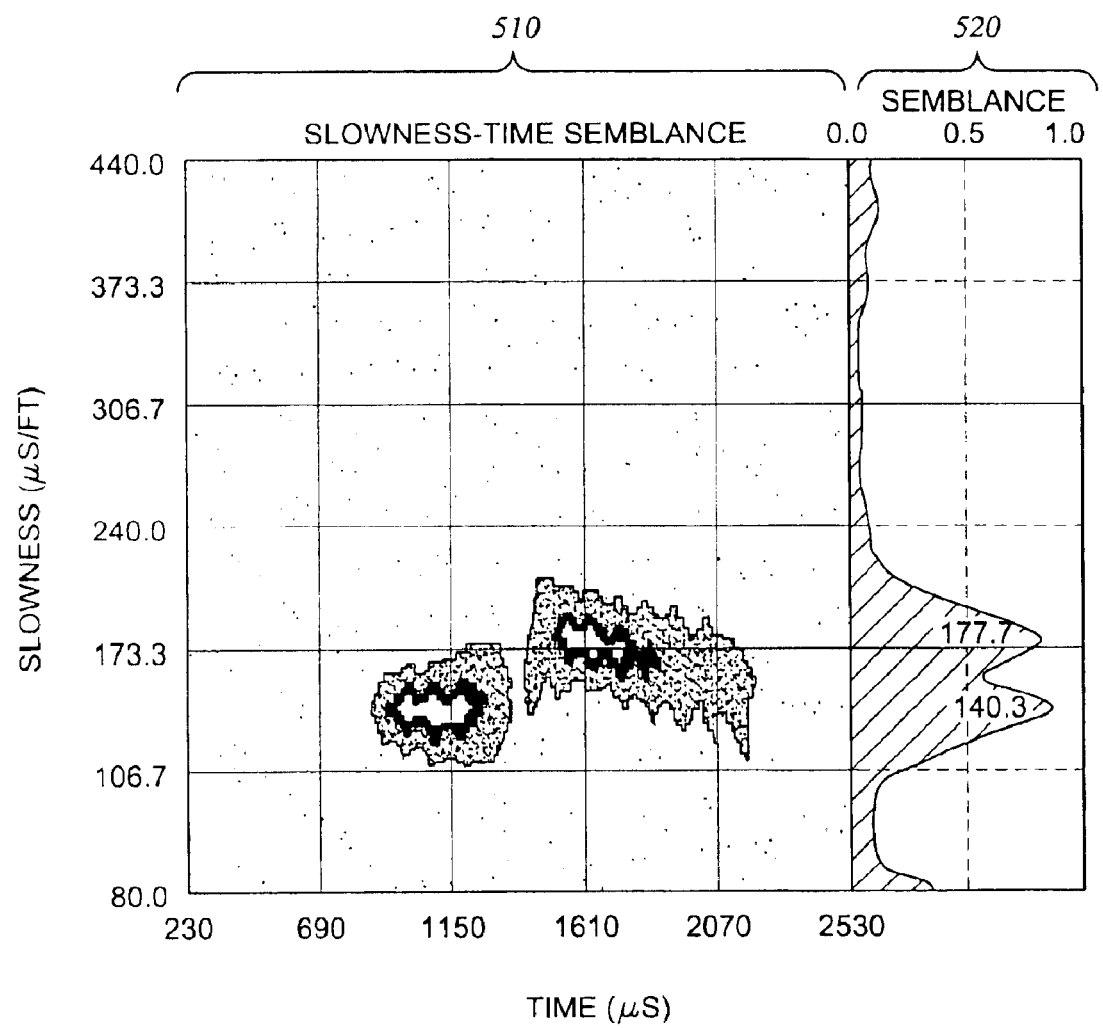
FIG. 5 shows time semblance as a function of slowness and time indicating the fast wave and slow wave after moving average smoothing.

FIG. 5 shows the time semblance plot 510 after the above-described moving average filtering operation. As before, a separate graph 520 of maximum semblance as a function of slowness is provided. Note that, as before, two formation velocities are clearly present, although some remainder of the interference artifact remains.

Figure 6:
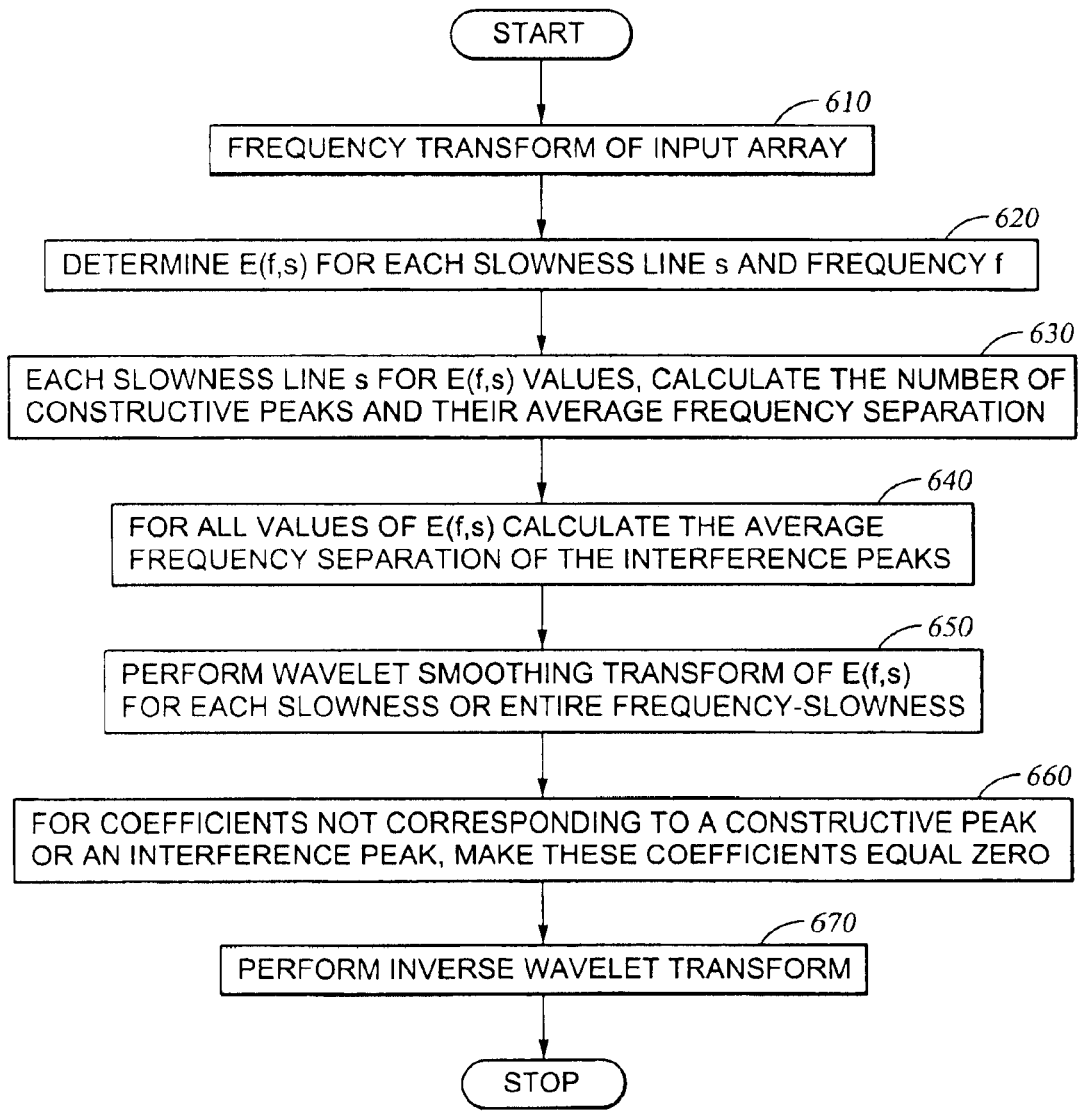
FIG. 6 shows a method in accordance with one exemplary embodiment of the present invention to determine phase semblance for each slowness line s and frequency f using wavelet smoothing/denoising.

FIG. 6 shows an exemplary embodiment of a method for calculating the phase semblance E(f,s) using a phase coherence method of acoustic wave data analysis. In block 610, the recorded waveforms are transformed to the frequency domain, i.e., Fourier transformed. In block 620, a phase semblance E(f,s) is determined as a function of slowness and frequency according to the following equation:

$$E(f,s) = \frac{1}{N} \frac{\left\| \sum_{i=1}^{N} \Phi[X_i(f)e^{-j(2\pi f)sd_i}] \right\|^2}{\sum_{i=1}^{N} \|\Phi[X_i(f)e^{-j(2\pi f)sd_i}]\|^2} \quad (2)$$

In the above equation, N is the number of receivers, and hence is also the number of recorded waveforms, $X_i(f)$ is the Fourier transform of waveform $x_i(t)$, $d_i$ is the distance of the ith receiver from the transmitter, and exponential factor $e^{-j}(2\pi f)sd_i$ is the Fourier transform equivalent of the relative time shift (t-$sd_i$). $\Phi$ represents the phase operator of the complex number. For a complex number $Ae^{j\theta}$, the phase given by the phase operator is $\Phi[Ae^{j\theta}]=\theta$. (No attempt is made to limit the phase to a range of principal values.)

Referring still to FIG. 6, in block 630, for each slowness value s, the number and frequency separation of semblance peaks are determined. In block 640, the plot-average frequency separation may optionally be determined. In block 650, the acoustic logging tool performs a wavelet transform of the phase semblance E(f,s) with an integration along the frequency axis. In block 660, some of the wavelet transform coefficients are set to zero. In one embodiment, the average frequency separation of semblance peaks for a given slowness value s is used to set a cutoff point in the wavelet domain. The cutoff point preferably corresponds to at least 1.5 times the average frequency separation. The wavelet transform coefficients above the cutoff point are set to zero, and in block 670, an inverse wavelet transform is performed. Blocks 630–670 thus form a wavelet denoise/smoothing method which is adapted for each slowness value.

Figure 7:
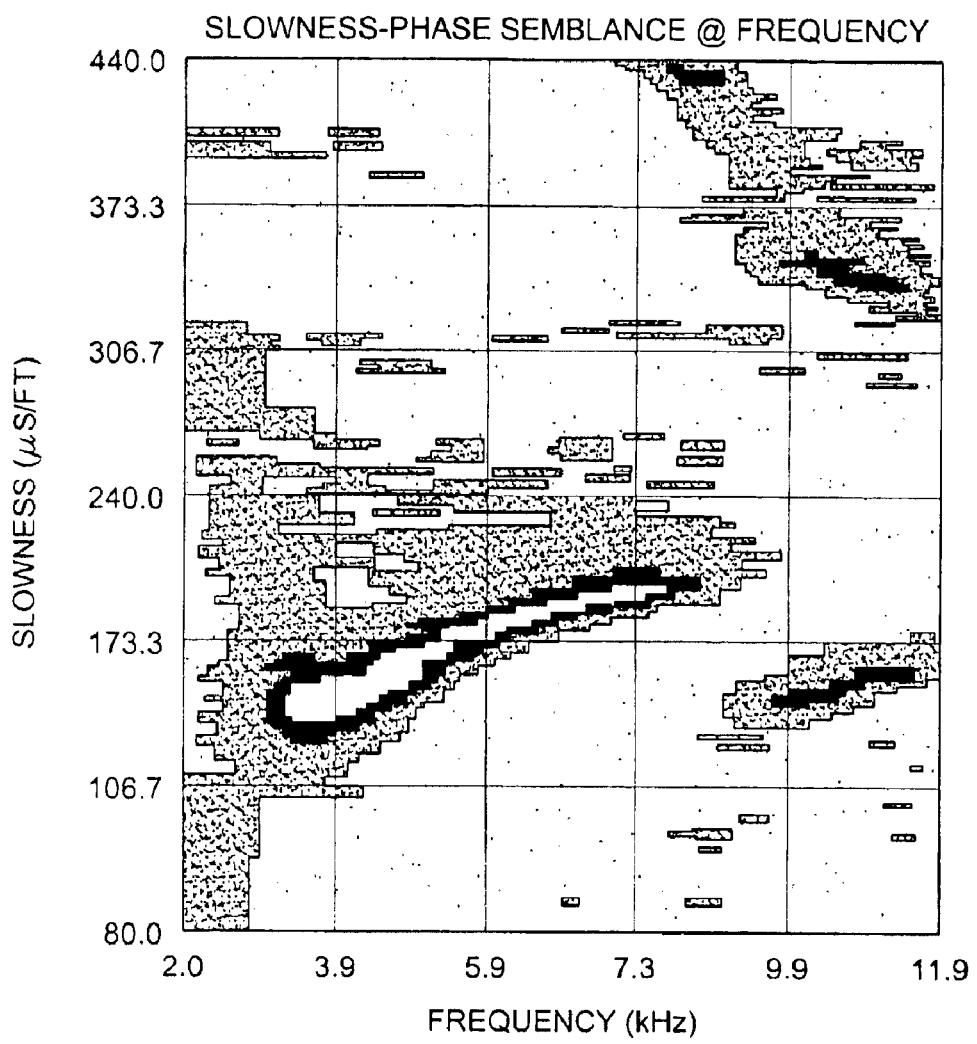
FIG. 7 shows a plot of phase semblance as a function of slowness and frequency after wavelet smoothing/denoising using the acoustic wave signals of FIG. 1A.
Figure 8:
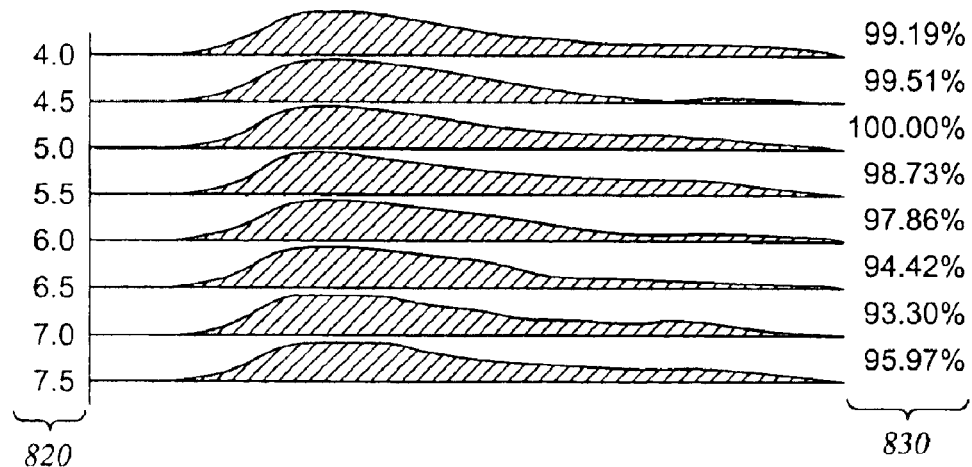
FIG. 8 shows a plot of frequency transforms of the waveforms in FIG. 1A.

Turning now to FIG. 7, the plot of phase semblance E(f,s) smoothed in accordance with the above-detailed procedure is shown. The waveforms of FIG. 1A were used to determine this semblance, and FIG. 8 shows the magnitude of the Fourier transform of those waveforms. The transforms are labeled with distance 820 of the receiver from the transmitter. The transforms are normalized to have the same energy, and the normalization percentage 830 is shown for each waveform. The normalization percentage is the amplitude of the normalization factor relative to the transmitted energy.

Returning to FIG. 7, the semblance axis is perpendicular to the page, and the slowness and frequency axes are in the plane of the page. The relationship between wave frequency and propagation velocity (the inverse of slowness) is clearly visible in the plot as an elongated semblance peak sloping from the lower left to upper right in the figure. This peak presents a classic example of wave dispersion (the propagation velocity changes with frequency). On the right side of the figure, two additional peaks are present. The peak nearest the lower right corner indicates the presence of higher wave propagation modes that travel at velocities similar to those given by the elongated peak. The peak nearest the upper right corner of the figure is an artifact due to aliasing.

Numerous variations and modifications will become apparent to those skilled in the art once the above disclosure is fully appreciated. For example, the phase semblance may be smoothed using a moving average filter in a fashion similar to one of the outlined embodiments. Also, because the slowness corresponds to the inverse of propagation velocity, each of the methods outlined above may work equivalently with velocity in place of slowness.

What is claimed is:

1. A method of characterizing a formation, wherein the method comprises:

triggering an acoustic wave generator;

recording acoustic waveforms received by receivers proximate to the formation;

determining a phase semblance of the recorded acoustic waveforms as a function of slowness and frequency; and smoothing the phase semblance.

2. The method of claim 1, wherein the smoothing is adaptive.

3. The method of claim 1, wherein the smoothing includes:

performing a wavelet transform on the phase semblance to obtain wavelet transform coefficients;

eliminating all wavelet transform coefficients above a cutoff point; and calculating an inverse wavelet transform.

4. The method of claim 3, wherein the cutoff point is set in accordance with an average frequency separation between semblance peaks.

5. The method of claim 3, wherein said acts of performing, eliminating, and calculating are repeated for each slowness value in a range of slowness values.

6. The method of claim 4, wherein said cutoff point is re-determined for each slowness value.

7. The method of claim 1, wherein the smoothing includes:

using a moving average filter to smooth frequency dependence of the phase semblance.

8. The method of claim 7, wherein the moving average filter has a filter width that is set in accordance with an average frequency separation between semblance peaks.

9. The method of claim 8, wherein the filter width is re-determined for each slowness value.

* * * * *